United States Patent
Siebert (10) Patent No.: US 9,964,217 B2
(45) Date of Patent: May 8, 2018

(54) PROPORTIONAL VALVE (71) Applicant: Norgren GmbH, Alpen (DE)

(72) Inventor: Jorg Siebert, Esslingen (DE)

(73) Assignee: Norgren GmbH, Alpen (DE)

( * ) Notice: Subject to any disclaimer, the term of this patent is extended or adjusted under 35 U.S.C. 154(b) by 0 days. days.

(21) Appl. No.: 14/765,409

(22) PCT Filed: Feb. 6, 2014

(86) PCT No.: PCT/EP2014/052316
§ 371 (c)(1),
(2) Date: Aug. 3, 2015

(87) PCT Pub. No.: WO2014/122209
PCT Pub. Date: Aug. 14, 2014

(65) Prior Publication Data
US 2016/0010753 A1 Jan. 14, 2016

Related U.S. Application Data

(60) Provisional application No. 61/762,659, filed on Feb. 8, 2013.

(51) Int. Cl.
*F16K 31/06* (2006.01)
*F16K 1/54* (2006.01)

(52) U.S. Cl.
CPC ............ *F16K 1/54* (2013.01); *F16K 31/0655* (2013.01); *F16K 31/0658* (2013.01)

(58) Field of Classification Search
CPC ............ F16K 31/0655; F16K 31/0658; F16K 31/0675; F16K 1/54

USPC ....................................... 251/129.08, 129.15
See application file for complete search history.

(56) References Cited

U.S. PATENT DOCUMENTS 3,549,119 A * 12/1970 Sellers ................ F16K 31/0655
251/129.15
6,974,117 B2 * 12/2005 Dzialakiewicz .... F16K 31/0665
251/129.08
2006/0163513 A1 7/2006 Ishikawa et al.
(Continued)

FOREIGN PATENT DOCUMENTS

FR 1471035 2/1967
WO 9931421 A1 6/1999

*Primary Examiner* — Ian Paquette
(74) *Attorney, Agent, or Firm* — The Ollila Law Group LLC (57) ABSTRACT

A proportional valve (100) is provided that includes a movable armature (104) within a body (102), with the armature (104) including a poppet (107) and with the body (102) including one or more inflow ports (135) and an outflow bore (123), a valve seat (120) located on a projecting valve seat structure (119), with the valve seat (120) including a valve orifice (130) in fluid communication with the one or more inflow ports (135) and the outflow bore (123), and a flow flange (116) extending from the poppet (107) and including a flow flange wall (117) that surrounds the valve seat (120), forming a flange inflow channel (129) of a predetermined cross-sectional inflow area between the flow flange wall (117) and the valve seat structure (119), wherein the poppet (107) moves between closed and opened positions without changing the predetermined cross-sectional inflow area provided by the inflow channel (129).

15 Claims, 6 Drawing Sheets

(56) References Cited

U.S. PATENT DOCUMENTS

| | | | |
|---|---|---|---|
| 2010/0072812 A1* | 3/2010 | Voss | B60T 8/363 |
| | | | 303/119.3 |
| 2010/0269921 A1* | 10/2010 | Pifer | B60K 15/03519 |
| | | | 137/487.5 |
| 2011/0037006 A1* | 2/2011 | Zurke | F16K 31/0655 |
| | | | 251/129.15 |

* cited by examiner

PROPORTIONAL VALVE

CROSS-REFERENCE TO RELATED APPLICATIONS

This is a National Stage entry of International Application No. PCT/EP2014/052316, with an international filing date of Feb. 6, 2014, which claims priority of U.S. provisional patent application No. 61/762,659, filed Feb. 8, 2013, entitled "PROPORTIONAL VALVE".

BACKGROUND OF THE INVENTION

1. Field of the Invention

The invention is related to the field of valves, and more particularly, to proportional valves.

2. Description of the Prior Art

A proportional valve is a variable flow valve that may output a continuous range of flow rates. In the proportional valve, the valve opening amount may be proportional to a solenoid current in an associated valve actuation solenoid. As a result, the proportional valve can provide a regulated fluid flow ranging from a zero flow to a valve maximum flow.

Figure 1:
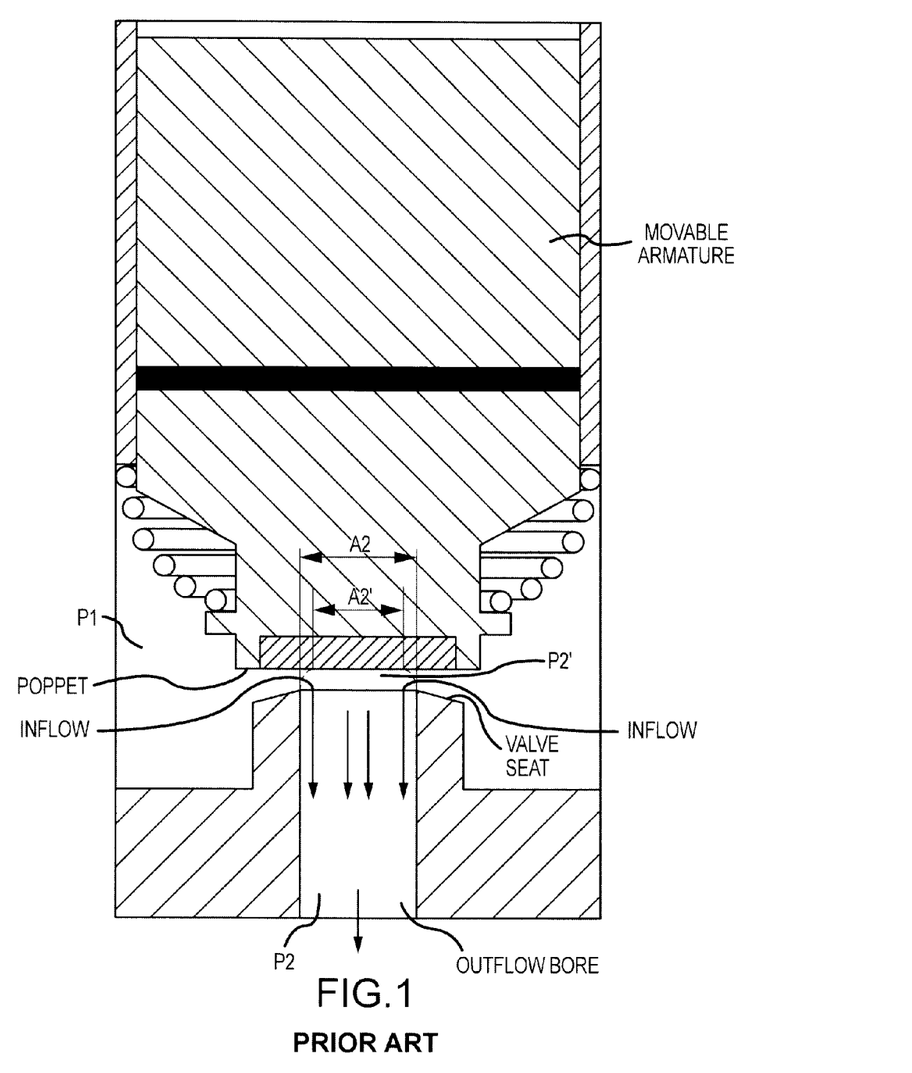
FIG. 1 shows prior art proportional valve.

FIG. 1 shows prior art proportional valve. In the prior art proportional valve, a poppet portion of a movable solenoid armature contacts and blocks a valve seat. The poppet may be moved away from the valve seat in order to open the valve and permit flow. The poppet may be moved away from the valve seat by any distance up to a maximum opening displacement.

The proportional valve may comprise a solenoid valve that generates magnetic force in order to open the valve armature. The magnetic force operates in opposition to a biasing force generated by a spring, with the biasing force holding the valve armature in a normally closed position in the proportional valve embodiment shown in the figure. The magnet force must overcome the spring force in order to move the valve armature/poppet in an opening direction.

However, when the fluid is flowing, such as when the valve armature is open even a small amount, then fluid static and/or dynamic pressures may also act on the valve armature. For small Mach numbers, Bernoulli's equation for compressible flow may be used to determine the static pressure of the fluid in the prior art valve. Bernoulli's equation comprises:

$$v^2/2 + \psi + p/\rho = \text{constant}$$

The static fluid pressure is defined as (P) and the fluid velocity is (v). The ($\rho$) term is the density of the fluid. Here, it is assumed that ($\rho$) is constant. The ($\psi$) term is the force potential at a point considered on a streamline, e.g., is the force potential due to the Earth's gravity where (g) is an acceleration due to gravity and z is an elevation value above a reference plane, wherein w is defined as $\psi = gz$. The dynamic fluid pressure is defined as $(\rho/2 \cdot v^2)$.

The Coanda effect comprises the tendency of a moving jet of fluid to be attracted to a nearby surface, or a surface to be pulled toward the jet of fluid. The Coanda effect influences the movement of the prior art valve armature/poppet. When the fluid is not flowing through the valve, then there is only static fluid pressure present in the valve. When the fluid is flowing, the static pressure decreases and the dynamic fluid pressure increases. The valve armature, which is at the region where the dynamic pressure occurs, will experience a static pressure force in the direction of the valve seat, and consequently will have a tendency to stick. This Coanda effect is only active or effective at comparatively small opening displacements of the valve armature.

As the armature moves in an opening direction and opens the orifice A2, the effective orifice area A2' decreases, which means that the opening force $F = ((A1-A2') \cdot P1)$ grows larger and pushes the armature toward the fully open position. As a result, a stable force balance is only possible at small valve armature/poppet openings, when the flow force (i.e., the Coanda effect) helps to stabilize the valve armature.

Additionally, when the flow is high, there is a pressure drop from P2 to P2'. However, the pressure P2' will increase when the fluid flow becomes higher. The straight and regular outflow bore of the prior art proportional valve therefore creates an additional opening force (A2'*P2'). This additional opening force is the root cause of the sticking effect on the valve armature when the valve armature is in the fully opened position.

The prior art proportional valve has drawbacks. The amount of actuation distance between the poppet and the valve seat can affect the flow in the prior art proportional valve. When the prior art poppet is moved upward by the energization of a solenoid coil, then an effective pressure area is increased and causes an increased opening force to act on the poppet surface area and create an upward force in the figure. The flow can change a dynamic pressure underneath the prior art poppet member, and the dynamic pressure can affect the poppet opening force and the poppet opening displacement.

The resulting force makes precise control of the prior art proportional poppet valve difficult, wherein the prior art proportional poppet valve may not maintain accurate proportional flow, as the increased dynamic pressure underneath the valve poppet may open the poppet by an additional, unwanted amount. The pressure can therefore affect the flow rate of fluid through the prior art proportional valve, making the prior art proportional valve less accurate and less reliable.

The prior art proportional valve may experience a condition where the poppet is not capable of being controlled past a certain opening distance, and instead the poppet may go from a partial actuation to a fully open actuation, where the solenoid opening force is aided by the increased dynamic pressure. As a result, the solenoid loses the ability to make further small changes in poppet displacement. In addition, the dynamic pressure force may operate to stick the poppet in the fully open position under some conditions.

What is needed, therefore, is an improved proportional valve wherein fluid flow does not significantly affect the position or displacement of the poppet.

ASPECTS OF THE INVENTION

In some aspects of the invention, a proportional valve comprises:
- a movable armature within a body, with the armature including a poppet and with the body including one or more inflow ports and an outflow bore;
- a valve seat located on a projecting valve seat structure, with the valve seat including a valve orifice in fluid communication with the one or more inflow ports and the outflow bore; and
- a flow flange extending from the poppet and including a flow flange wall that surrounds the valve seat, forming a flange inflow channel of a predetermined cross-sectional inflow area between the flow flange wall and the valve seat structure, wherein the poppet moves between substantially fully closed and substantially fully opened positions without changing the predetermined cross-sectional inflow area provided by the inflow channel.

Preferably, the flow flange is affixed to the poppet.

Preferably, the flow flange is formed into the poppet.

Preferably, the flow flange wall is substantially parallel with respect to a side of the valve seat structure.

Preferably, the flow flange wall is angled with respect to a side of the valve seat structure.

Preferably, a flow flange wall shape of the flow flange wall substantially corresponds to a valve seat structure shape of the valve seat structure.

Preferably, the flow flange wall of the flow flange is of a predetermined height so that the flow flange wall remains surrounding the valve seat structure for a predetermined portion of a valve opening displacement of the poppet.

Preferably, the flow flange wall of the flow flange is of a predetermined height so that the flow flange wall remains surrounding the valve seat structure even at a maximum opening displacement of the poppet.

Preferably, an outflow bore cross-sectional area A5 of the outflow bore is larger than a valve orifice cross-sectional area A2 of the valve orifice.

In some aspects of the invention, a proportional valve comprises:
 a movable armature within a body, with the armature including a poppet and with the body including one or more inflow ports and an outflow bore;
 a valve seat located on a projecting valve seat structure, with the valve seat including a valve orifice in fluid communication with the one or more inflow ports and the outflow bore;
 a flow flange extending from the poppet and including a flow flange wall that surrounds the valve seat, forming a flange inflow channel of a predetermined cross-sectional inflow area between the flow flange wall and the valve seat structure, wherein the poppet moves between substantially fully closed and substantially fully opened positions without changing the predetermined cross-sectional inflow area provided by the inflow channel; and
 an outflow bore shoulder formed in the outflow bore, wherein an outflow bore cross-sectional area A5 of the outflow bore is larger than a valve orifice cross-sectional area A2 of the valve orifice.

Preferably, the flow flange is affixed to the poppet.

Preferably, the flow flange is formed into the poppet.

Preferably, the flow flange wall is substantially parallel with respect to a side of the valve seat structure.

Preferably, the flow flange wall is angled with respect to a side of the valve seat structure.

Preferably, a flow flange wall shape of the flow flange wall substantially corresponds to a valve seat structure shape of the valve seat structure.

Preferably, the flow flange wall of the flow flange is of a predetermined height so that the flow flange wall remains surrounding the valve seat structure for a predetermined portion of a valve opening displacement of the poppet.

Preferably, the flow flange wall of the flow flange is of a predetermined height so that the flow flange wall remains surrounding the valve seat structure even at a maximum opening displacement of the poppet.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 2-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
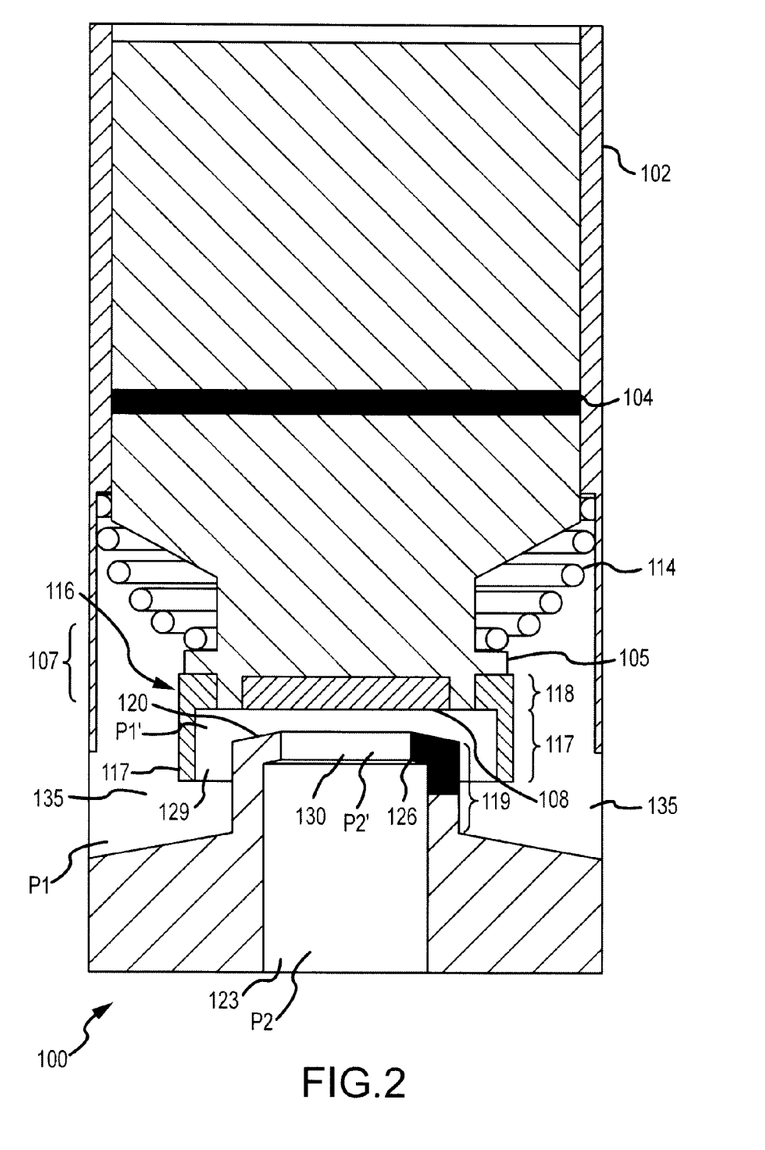
FIG. 2 shows a proportional valve according to the invention.

FIG. 2 shows a proportional valve 100 according to the invention. The proportional valve 100 comprises a body 102 including one or more inflow ports 135 and an outflow bore 123. A movable armature 104 is configured to move reciprocally within the body 102 under the influence of a solenoid coil (not shown). The armature 104 includes a poppet 107 that is configured to contact a valve seat 120. The poppet 107 of the armature 104 may block and unblock a valve orifice 130 formed in the valve seat 120. As a consequence, fluid enters the proportional valve 100 through the one or more inflow ports 135, can be selectively admitted and regulated through the valve orifice 130, and exits the proportional valve via the outflow bore 123.

The poppet 107 may include a poppet seal 108. The poppet seal 108 may comprise a flexible, resilient, and/or compressible material that will at least somewhat partially conform to the valve seat 120 when the poppet 107 is put into a blocking position, contacting the valve seat 120.

A biasing device 114 is positioned to exert a downward (i.e., closing) force on the armature 104 in the embodiment shown. The biasing device 114 may comprise a spring or coil spring. Alternatively, the biasing device 114 may comprise any other suitable biasing device. The armature may include a biasing flange 105, wherein the biasing device 114 extends between, and is held in position between, the body 102 and the biasing flange 105.

The proportional valve 100 as shown in the figure comprises a normally-closed (NC) valve 100, wherein the biasing device 114 provides a closing biasing force to the armature 104. Alternatively, the biasing device 114 may be configured so that the proportional valve comprises a normally-open (NO) valve, wherein the biasing device 114 provides an opening biasing force to the armature 104.

The valve seat 120 may comprise a portion of a valve seat structure 119. The valve seat structure 119 may comprise a projecting structure that extends from a base region. The valve seat structure 119 may have any desired shape, including circular/cylindrical, but may be formed in other shapes, as desired. It should be understood that the poppet 107 may exactly or approximately correspond in shape to the valve seat structure 119.

The base region of the valve seat structure 119 may have angled base faces, as shown. Alternatively, the valve seat structure 119 may project from a substantially planar base face (not shown). The valve seat structure 119 terminates in the valve seat 120, wherein the valve seat 120 may include a substantially flat contact face or may include an angled contact face.

The poppet 108 in the embodiment shown includes a flow flange 116. The flow flange 116 may include a flow flange wall 117 and a flow flange base 118. The flow flange wall 117 in the embodiment shown is substantially parallel with respect to a side (or sides) of the valve seat structure 119.

The shape of the flow flange wall 117 may correspond approximately to the shape of the valve seat structure 119. The shape of the flow flange wall 117 may correspond exactly to the shape of the valve seat structure 119. The flow flange 116 comprises a substantially hollow structure, wherein a flange extends down and around the valve seat 120, but with a flange inflow channel 129 separating the flow flange 116 from the valve seat 120. Fluid may flow through the flange inflow channel 129 and may therefore flow between the flow flange 116 and the structure of the valve seat 120.

The flow flange wall 117 may have a predetermined height. The flow flange wall 117 may be of a predetermined height wherein the flow flange wall 117 remains surrounding the valve seat structure 119 for a predetermined portion of a valve opening displacement of the poppet 107. The flow flange wall 117 may be of a predetermined height wherein the flow flange wall 117 remains surrounding the valve seat structure 119 even at a maximum opening displacement of the poppet 107. The flow flange wall 117 may be of a predetermined height wherein the flow flange wall 117 surrounds the valve seat 120 at all times. The flow flange wall 117 therefore will maintain the flange inflow channel 129, regardless of whether the poppet 107 is blocking the valve orifice 130 or whether the poppet 107 is a maximum displacement distance away from the valve seat 120 (i.e., the proportional valve 100 is open a maximum amount).

As a result, the flange inflow channel 129 comprises a fixed inflow cross-sectional area, regardless of the position or displacement of the poppet 107 with regard to the valve seat 120. The poppet 107 is configured to be moved between substantially fully closed and substantially fully opened positions without changing the predetermined cross-sectional inflow area provided by the inflow channel 129. Consequently, the cross-sectional inflow area of the proportional valve 100 does not change due to the position or displacement of the poppet 107. The cross-sectional inflow area therefore does not affect the fluid inflow and does not affect the dynamic pressure of the fluid inflow.

The flow flange 116 may comprise a separate component that is permanently or removably affixed to the poppet 107 of the armature 104. The flow flange 116 may be affixed to the poppet 107 in any manner, including a compression or friction fit, through use of adhesive, through use of welding or other thermal bonding methods, or fasteners. This listing is not exhaustive, and it is contemplated that the flow flange 116 may be affixed to the poppet 107 in other ways. Alternatively, the flow flange 116 may be formed as part of the armature 104 and may be formed into the poppet 107 (see FIG. 4 and the accompanying text).

By reducing the dynamic fluid pressure in the region of the contact face of the poppet 107, the upward force on the armature 104 is reduced, wherein the fluid velocity and/or dynamic pressure has less effect on the position and displacement of the armature 104.

The outflow bore 123 in the embodiment shown includes an outflow bore shoulder 126, wherein the outflow bore 123 is larger in cross-sectional area than the valve orifice 130. As a result, the fluid flowing through the valve orifice 130 and then through the outflow bore 123 will transition from a cross-sectional shape of a first cross-sectional area to a bore having a larger cross-sectional area. As a result, the fluid flow will be able to expand as it passes into the outflow bore 123. As a result, the fluid will experience a decrease in velocity due to the increased cross-sectional flow area. As a result, the fluid will experience a reduced dynamic pressure due to the increased cross-sectional flow area and the decreased flow velocity.

The outflow bore shoulder 126 of the outflow bore 123 may induce turbulence in the outflow of the fluid as the fluid passes through the outflow bore 123. The outflow bore shoulder 126 of the outflow bore 123 may enable the expansion of the fluid as the fluid flows out through the outflow bore 123.

The flow flange 116 and the outflow bore 123 may cooperate to further provide desirable fluid flow characteristics through the proportional valve 100. The flow flange 116 may speed up the velocity of the fluid flow before the fluid passes into the valve orifice 130, while the shoulder 126 and the outflow bore 123 may advantageously slow down the velocity of the fluid flow after the fluid passes through the valve orifice 130. The flow flange 116 may increase the dynamic pressure of the fluid flow before the fluid passes into the valve orifice 130, while the shoulder 126 and the outflow bore 123 may advantageously decrease the dynamic pressure of the fluid flow after the fluid passes through the valve orifice 130.

In some embodiments, as shown, the flow flange 116 and the valve seat structure 119 feature sharp corners or edges. Alternatively, some or all of the corners or edges of the flow flange 116 and the valve seat structure 119 may be rounded, smoothed, or shaped in a more aerodynamic manner. This may include the edge or edges of the valve orifice 130.

The shape of the corners and edges of the flow flange 116 and the valve seat structure 119 may affect the fluid flow by generating flow turbulence. The shape of the corners and edges of the flow flange 116 and the valve seat structure 119 may be designed to create or increase turbulent flow, or to create or increase turbulent flow at predetermined flow locations. In some embodiments, the shape of the corners and edges of the flow flange 116 and the valve seat structure 119 may be shaped to create a predetermined turbulent flow pattern or flow profile. Alternatively, the shape of the corners and edges of the flow flange 116 and the valve seat structure 119 may be designed to reduce turbulent flow, or to reduce turbulent flow at predetermined flow locations.

In some embodiments, the one or more inflow ports 135 may be located in a region above the bottom of the flow flange wall 117, wherein a flow path length is lengthened by the placement of the one or more inflow ports 135. It should be understood that the one or more inflow ports 135 may be placed at any desired location with respect to the bottom of the flow flange wall 117.

In the embodiment shown, the Coanda effect still occurs and is valid as long as the valve armature is only partially open. The difference between the present embodiment and the prior art proportional valve is that the flow flange 116 causes a pressure drop from P1 to P1'. Consequently, the opening force (which is $((A1-A2')*P1)$ in the prior art proportional valve) is reduced to $((A1-A4)*P1+(A4-A2')*P1')$. The reduction of the opening force, in combination with the other forces acting on the poppet 107, enables a balancing of forces. Also, when the flow force due to the Coanda effect acts to stabilize the poppet 107 in the closing direction, then the Coanda effect force is minimal and has a negligible effect on the poppet 107.

In addition, the outflow bore shoulder 126 reduces flow forces on the poppet 107. The widening of the outlet bore area from A2 to A5 (see FIG. 6) reduces the pressure drop that occurs between P2' to P2. The pressure P2' at the outflow bore shoulder 126 is only marginally greater than the pressure P2 in the outflow bore 123. The reduction in the pressure drop from P2' to P2 reduces the sticking force acting on the poppet 107.

Figure 3:
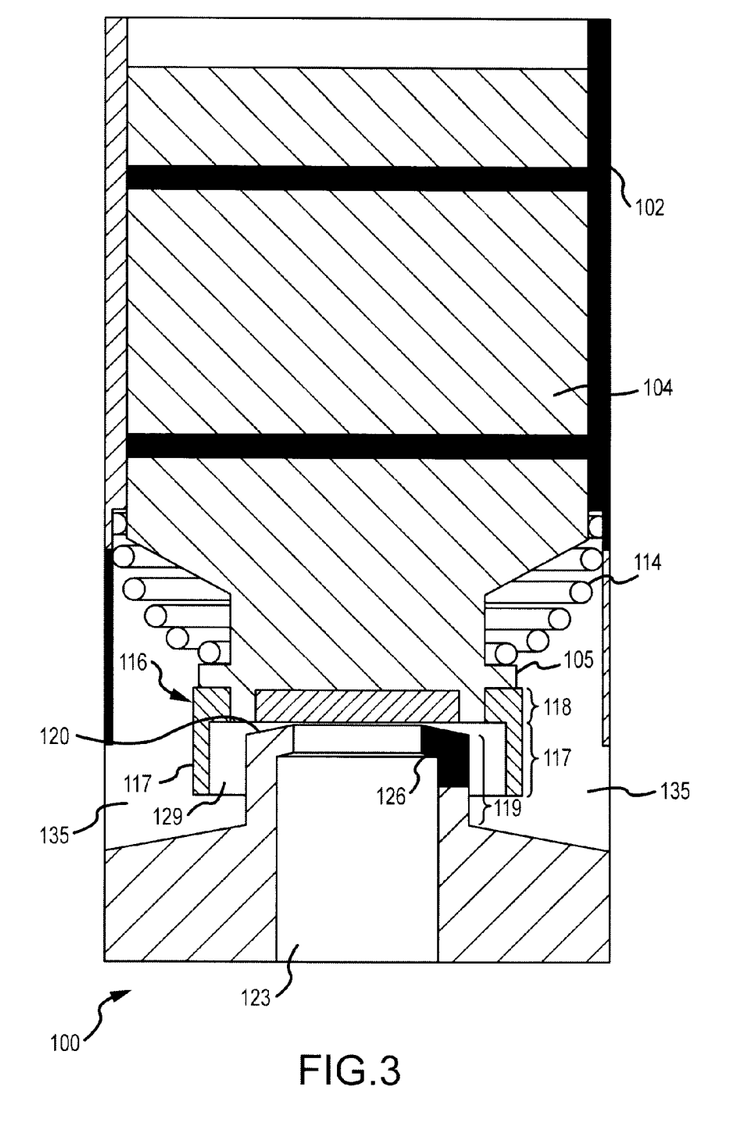
FIG. 3 shows the proportional valve wherein the armature and the poppet have been moved to a closed or blocking position with respect to the valve seat.

FIG. 3 shows the proportional valve 100 wherein the armature 104 and the poppet 107 have been moved to a closed or blocking position with respect to the valve seat 120. It can be seen from the figure that the flow flange 116 does not affect the closing of the valve orifice 130. It can further be seen from the figure that the flange inflow channel 129 remains substantially unchanged in both cross-sectional area and orientation.

Figure 4:
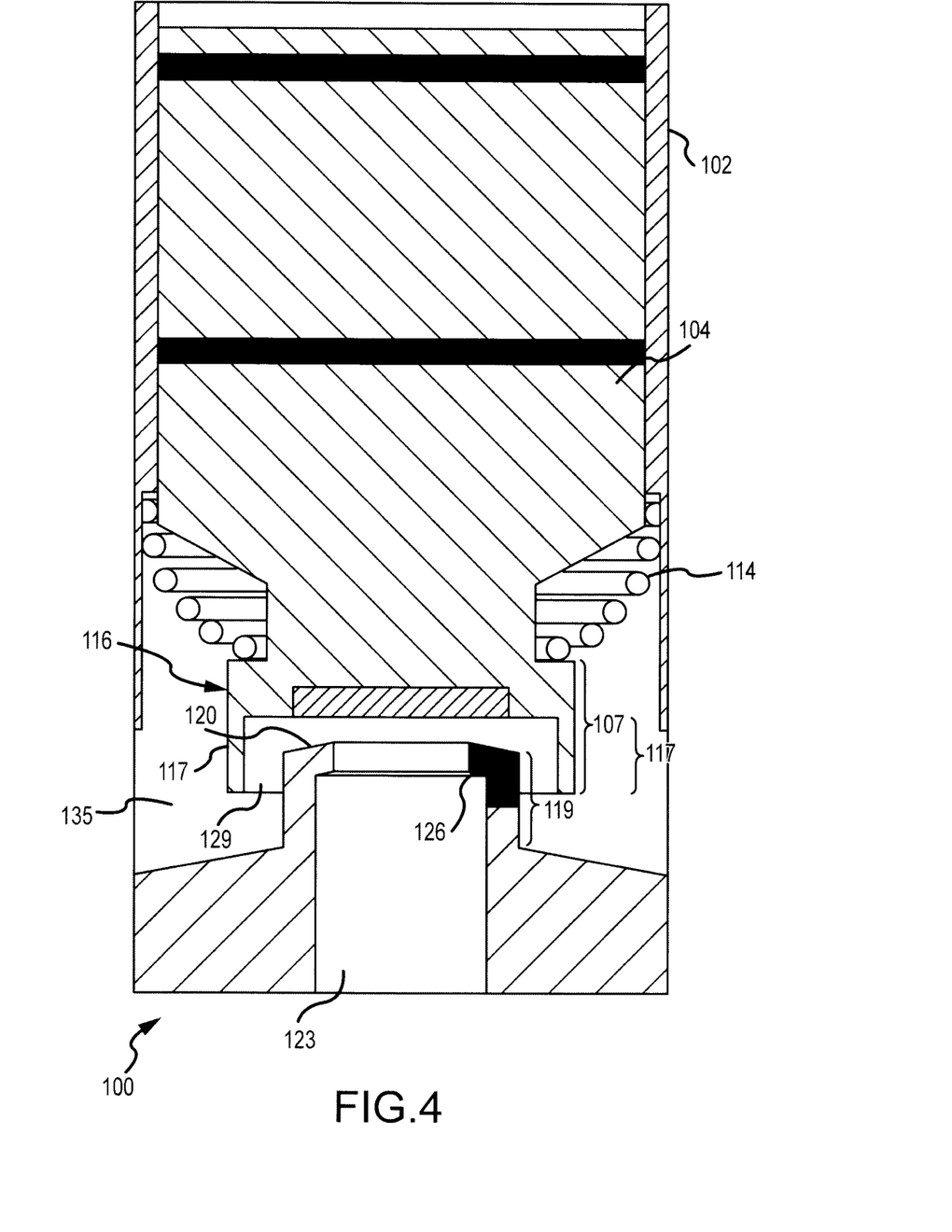
FIG. 4 shows the proportional valve wherein the flow flange comprises a portion of the poppet.

FIG. 4 shows the proportional valve 100 wherein the flow flange 116 comprises a portion of the poppet 107. The flow flange 116 may be formed of the same material as the armature 104, in this embodiment. The principle of operation of the flow flange 116 remains the same.

Figure 5:
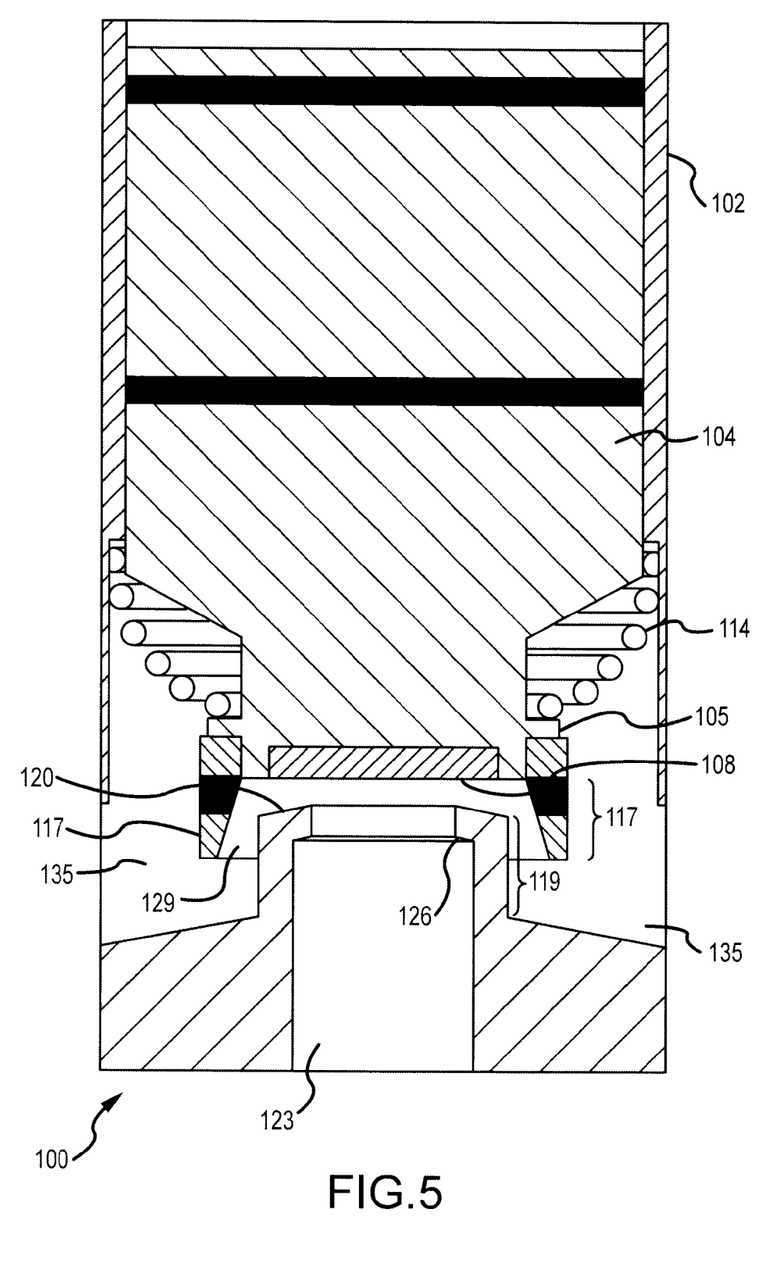
FIG. 5 shows the proportional valve wherein the flow flange wall is angled with respect to the side or sides of the valve seat structure.

FIG. 5 shows the proportional valve 100 wherein the flow flange wall 117 is angled with respect to a side (or sides) of the valve seat structure 119. The angle may comprise angling the interior surface of the flow flange wall 117 toward or away from the valve seat structure 119. As a result, the interior surface of the flow flange wall 117 is no longer substantially parallel to the side or sides of the valve seat structure 119. As a result, the flange inflow channel 129 decreases in cross-sectional flow area, which may further accelerate the flow velocity and may further reduce the dynamic fluid pressure upstream of the valve orifice 130.

Alternatively, the flow flange wall 117 may be formed into a non-uniform shape. As is shown in the figure, the flow flange wall 117 may be thicker at the top than at the bottom, creating the angled inner surface. Alternatively, the flow flange wall 117 could be thicker at the bottom or at a region between the top and the bottom of the flow flange wall 117.

Figure 6:
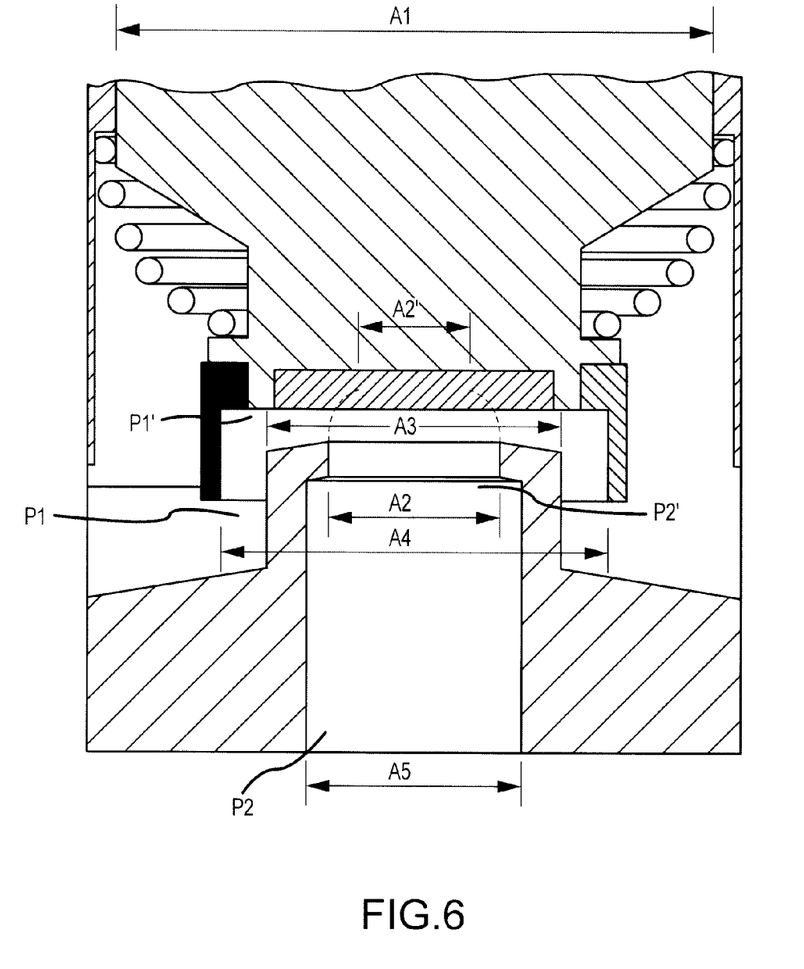
FIG. 6 shows area relationships of the proportional valve according to an embodiment of the invention.

FIG. 6 shows area relationships of the proportional valve 100 according to an embodiment of the invention. The proportional valve 100 has an armature cross-sectional area A1. The proportional valve 100 has a valve orifice cross-sectional area A2. The proportional valve 100 has a valve seat cross-sectional area A3. The proportional valve 100 has a flow flange cross-sectional area A4. The proportional valve 100 has an outflow bore cross-sectional area A5.

It can be seen that the inflow area $A_{inflow}$ comprises the difference between the flow flange cross-sectional area A4 and the valve seat cross-sectional area A3 ($A_{inflow}=A4-A3$). The inflow area $A_{inflow}$ does not change with movement of the poppet 107. Consequently, the fluid velocity will not change with varying opening distances between the poppet 107 and the valve seat 120. The dynamic fluid pressure acting upward on the poppet 107 will remain substantially constant as a result.

It can be seen that the outflow bore cross-sectional area A5 is greater than the valve orifice cross-sectional area A2. The difference in area comprises the size of the outflow bore shoulder 126. The difference in area will affect how much the fluid flow velocity changes when the fluid flows from the valve orifice 130 into the outflow bore 123.

The proportional valve 100 differs from the prior art. The flow flange 116 of the proportional valve 100 forces the fluid flow to enter from a specific region/direction, and fluid is not allowed to merely flow in a straight and direct manner into the poppet region.

The flow flange 116 of the proportional valve 100 presents a constant inflow area, regardless of the position of the valve poppet 107 with respect to the valve seat 120. The flow flange 116 of the proportional valve 100 causes the inflowing fluid to increase in velocity before passing into the valve orifice 130. The flow flange 116 of the proportional valve 100 causes the inflowing fluid to have a lowered dynamic pressure due to the increased flow velocity of the fluid.

The stepped outflow bore 123 of the proportional valve 100 includes a shoulder, wherein the outflow bore 123 is larger in cross-sectional area than the valve orifice 130. The stepped outflow bore 123 of the proportional valve 100 allows expansion of the fluid after it passes through the valve orifice 130. The stepped outflow bore 123 of the proportional valve 100 slows the fluid velocity after the fluid passes through the valve orifice, allowing expansion of the fluid and an increased dynamic pressure as a result of the decreased flow velocity.

The various embodiments of the invention can be implemented to provide several advantages, if desired. The fixed cross-sectional inflow area of the proportional valve 100 increases the fluid velocity before the fluid encounters the valve seat 120. The fixed cross-sectional inflow area of the proportional valve 100 decreases the fluid dynamic pressure before the fluid encounters the valve seat 120. The decreased fluid dynamic pressure of the proportional valve 100 decreases the fluid dynamic force acting on the poppet 107. The decreased fluid dynamic pressure of the proportional valve 100 exerts less destabilizing force on the poppet, wherein the armature and poppet are acted on mainly by the forces of the spring and the solenoid coil, resulting in a more accurate proportional control of the flow.

The increased cross-sectional outflow area of the outflow bore 123 of the proportional valve 100 decreases the fluid velocity after the fluid encounters the valve seat 120. The increased cross-sectional outflow area of the outflow bore 123 of the proportional valve 100 increases the fluid dynamic pressure after the fluid encounters the valve seat 120.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and method, and not just to the embodiments described above and shown in the accompanying figures. Accordingly, the scope of the invention should be determined from the following claims.

We claim:

1. A proportional valve (100), comprising:
   a movable armature (104) within a body (102), with the armature (104) including a poppet (107) and with the body (102) including one or more inflow ports (135) and an outflow bore (123);
   a valve seat (120) which comprises a portion of a valve seat structure (119), with the valve seat (120) including a valve orifice (130) in fluid communication with the one or more inflow ports (135) and the outflow bore (123), wherein the valve seat (120) defines an opening of the outflow bore (123); and
   a flow flange (116) extending from the poppet (107) and including a flow flange wall (117) that surrounds the valve seat (120), forming a flange inflow channel (129) of a predetermined cross-sectional inflow area between the flow flange wall (117) and the valve seat structure (119), wherein the poppet (107) moves between fully closed and fully opened positions without changing the predetermined cross-sectional inflow area provided by the inflow channel (129).

2. The proportional valve (100) of claim 1, wherein the flow flange (116) is affixed to the poppet (107).

3. The proportional valve (100) of claim 1, wherein the flow flange (116) is formed into the poppet (107).

4. The proportional valve (100) of claim 1, wherein the flow flange wall (117) is parallel with respect to a side of the valve seat structure (119).

5. The proportional valve (100) of claim 1, wherein a flow flange wall shape of the flow flange wall (117) corresponds to a valve seat structure shape of the valve seat structure (119).

6. The proportional valve (100) of claim 1, wherein the flow flange wall (117) of the flow flange (116) is of a predetermined height so that the flow flange wall (117) remains surrounding the valve seat structure (119) for a predetermined portion of a valve opening displacement of the poppet (107).

7. The proportional valve (100) of claim 1, wherein the flow flange wall (117) of the flow flange (116) is of a predetermined height so that the flow flange wall (117) remains surrounding the valve seat structure (119) even at a maximum opening displacement of the poppet (107).

8. The proportional valve (100) of claim 1, wherein an outflow bore cross-sectional area A5 of the outflow bore (123) is larger than a valve orifice cross-sectional area A2 of the valve orifice (130).

9. A proportional valve (100), comprising:
   a movable armature (104) within a body (102), with the armature (104) including a poppet (107) and with the body (102) including one or more inflow ports (135) and an outflow bore (123);
   a valve seat (120) located on a projecting valve seat structure (119), with the valve seat (120) including a valve orifice (130) in fluid communication with the one or more inflow ports (135) and the outflow bore (123), wherein the valve seat (120) defines an opening of the outflow bore (123);
   a flow flange (116) extending from the poppet (107) and including a flow flange wall (117) that surrounds the valve seat structure (119) which comprises the valve seat (120), forming a flange inflow channel (129) of a predetermined cross-sectional inflow area between the flow flange wall (117) and the valve seat structure (119), wherein the poppet (107) moves between fully closed and fully opened positions without changing the predetermined cross-sectional inflow area provided by the inflow channel (129); and
   an outflow bore shoulder (126) formed in the outflow bore (123), wherein an outflow bore cross-sectional area (A5) of the outflow bore (123) is larger than a valve orifice cross-sectional area (A2) of the valve orifice (130).

10. The proportional valve (100) of claim 9, wherein the flow flange (116) is affixed to the poppet (107).

11. The proportional valve (100) of claim 9, wherein the flow flange (116) is formed into the poppet (107).

12. The proportional valve (100) of claim 9, wherein the flow flange wall (117) is parallel with respect to a side of the valve seat structure (119).

13. The proportional valve (100) of claim 9, wherein a flow flange wall shape of the flow flange wall (117) corresponds to a valve seat structure shape of the valve seat structure (119).

14. The proportional valve (100) of claim 9, wherein the flow flange wall (117) of the flow flange (116) is of a predetermined height so that the flow flange wall (117) remains surrounding the valve seat structure (119) for a predetermined portion of a valve opening displacement of the poppet (107).

15. The proportional valve (100) of claim 9, wherein the flow flange wall (117) of the flow flange (116) is of a predetermined height so that the flow flange wall (117) remains surrounding the valve seat structure (119) even at a maximum opening displacement of the poppet (107).

* * * * *